(12) United States Patent
Engelage

(10) Patent No.: US 7,453,331 B2
(45) Date of Patent: Nov. 18, 2008

(54) POLYPHASE LINE FILTER

(75) Inventor: Thorsten Engelage, Hille (DE)

(73) Assignee: Brinkmann GmbH & Co. Kg, Barntrup (DE)

( * ) Notice: Subject to any disclaimer, the term of this patent is extended or adjusted under 35 U.S.C. 154(b) by 0 days.

(21) Appl. No.: 11/742,475

(22) Filed: Apr. 30, 2007

(65) Prior Publication Data

US 2007/0258273 A1 Nov. 8, 2007

Related U.S. Application Data

(63) Continuation of application No. PCT/EP2005/011471, filed on Oct. 26, 2005.

(30) Foreign Application Priority Data

Oct. 29, 2004 (DE) .................... 10 2004 052 700

(51) Int. Cl.
*H03H 7/00* (2006.01)
(52) U.S. Cl. .................... 333/181; 333/177; 333/185
(58) Field of Classification Search ............... 333/172, 333/175, 177, 181, 185
See application file for complete search history.

(56) References Cited

U.S. PATENT DOCUMENTS 6,075,425 A * 6/2000 Gopfrich et al. ............ 333/181

6,339,265 B1 * 1/2002 Levin et al. ................. 307/407
2006/0197385 A1 * 9/2006 Levin et al. ................. 307/105

FOREIGN PATENT DOCUMENTS

DE 3826524 A1 3/1989
DE 19829424 A1 1/1999

* cited by examiner

*Primary Examiner*—Robert J. Pascal
*Assistant Examiner*—Kimberly E Glenn
(74) *Attorney, Agent, or Firm*—Michael A. Glenn; Glenn Patent Group

(57) ABSTRACT

A polyphase line filter includes a first filter branch between a first filter input and a first filter output, the first filter branch comprising a series connection of at least two inductances wound onto different legs of a multi-leg filter core, and a second filter branch between a second filter input and a second filter output, the second filter branch comprising a series connection of at least two inductances wound onto the different legs of the multi-leg filter core. An inventive polyphase line filter has a smaller setup volume, a smaller power dissipation and is less expensive than conventional polyphase line filters. In connection with electronical appliances having internal B2 or B6 rectifier circuits and subsequent smoothing by capacitors, the inventive polyphase line filter provides for a smoothed direct current downstream of the rectifier and for a strongly reduced ripple current in the smoothing capacitors of a consumer.

10 Claims, 10 Drawing Sheets

US 7,453,331 B2

POLYPHASE LINE FILTER

CROSS-REFERENCE TO RELATED APPLICATIONS

This application is a continuation of copending International Application No. PCT/EP2005/011471, filed Oct. 26, 2005, which designated the United States and was not published in English, and is incorporated herein by reference in its entirety.

TECHNICAL FIELD

The present invention generally relates to a polyphase line or mains filter, in particular to a passive harmonic filter as front end at non-linear consumers or loads.

BACKGROUND

The strongly increasing proportion of power electronics in energy supply networks or mains, in particular in the field of drive engineering, means increasing distortion in the supply voltage due to the high harmonic contents of the current. In order to avoid harmonic currents in supply networks, standards specifying certain guidelines for manufacturers of electric and electronic devices have been issued in Europe over the last few years.

There are different active and passive solutions by different manufacturers worldwide for keeping to the standards, guidelines and recommendations issued. Depending on the power and application of the devices or the usage of the devices by the customer, these solutions may have advantages and/or disadvantages. Basically, active or passive devices and filters available at present for reducing current harmonics are not really attractive as to setup volume or cost and are thus only employed under certain circumstances.

For electronic devices having internal B2 and/or B6 rectifier circuits, the following conventional methods for reducing current harmonics are used: AC and DC chokes, higher-pulse rectifier circuits over B12, B18 or B24, acceptor circuit apparatuses, low-pass filters for 50 Hz or 60 Hz, special harmonic filters, means for an active sinusoidal current consumption (so-called active front ends) and active harmonic filters. The active harmonic filters here are operated in parallel on the network or mains.

Special harmonic filters will be explained in greater detail below. The special harmonic filters available at present exhibit a plurality of disadvantages, partly have very large setup volumes compared to consumers or cause immense expenses which often exceed the actual apparatus expenses of the consumer coupled thereto.

Since the circuit assembly of special harmonic filters fundamentally consists of inductive and capacitive components, three problems basically arise when operating the filter. High inductance values in the longitudinal branch of a filter result in a load-dependent voltage drops and may result in a reduced intermediate circuit voltage (direct voltage after a rectifier). This effect is partly compensated by connecting capacitances since capacitances raise the voltage again, however, a load-dependent voltage change will remain.

In addition, capacitors coupled in a shunt arm produce a capacitive reactive current which flows to the harmonic filter already under no-load conditions. A capacitive reactive current portion basically is to be kept very small since this so-called overcompensation is not desirable for energy supply companies. Some manufacturers of special harmonic filter thus offer the possibility of partly or completely switching off the capacitors under partial load conditions using a contactor. This in turn increases the expenses and complexity since such a contactor for a capacitive current should have suitable contacts and since the filter has to be integrated in the control flow.

Another disadvantage of conventional special harmonic filters to be mentioned is the resonance behavior of LC couplings. Basically, all circuits consisting of inductive and capacitive components have at least one resonance point. It is kept in mind in the case of filters that the frequencies arising are, if possible, not in the region of the resonance points, however, in dynamic load changes in connection with load changes at the supply network and/or switching on or off compensation units installed on the supply network, this is hardly foreseeable.

Thus, it shows that conventional special harmonic filters exhibit serious technological and economical disadvantages making usage thereof more difficult and/or expensive.

SUMMARY

According to an embodiment, a three-phase harmonic line filter may have: a first filter branch between a first filter input and a first filter output, the first filter branch having a first series connection of three inductances connected between the first filter input and the first filter output and wound onto three different legs of a three-leg filter core; a second filter branch between a second filter input and a second filter output, the second filter branch having a second series connection of three inductances connected between the second filter input and the second filter output and wound onto three different legs of the three-leg filter core; and a third filter branch between a third filter input and a third filter output, the third filter branch having a third series connection of three inductances connected between the third filter input and the third filter output and wound onto three different legs of the three-leg filter core, wherein input inductances or output inductances of the three filter branches are wound onto different legs of the three-leg filter core; wherein the first filter branch includes a first shunt inductance; wherein the second filter branch includes a second shunt inductance; wherein the third filter branch includes a third shunt inductance; wherein a node where two inductances of the first series connection are connected is coupled to a first terminal of capacitive energy storage means via the first shunt inductance; wherein a node where two inductances of the second series connection are connected is coupled to a second terminal of the capacitive energy storage means via the second shunt inductance; wherein a node where two inductances of the third series connection are connected is coupled to a third terminal of the capacitive energy storage means via the third shunt inductance; and wherein the three shunt inductances are arranged on the three legs of the three-leg filter core.

According to another embodiment, a method of operating a three-phase line filter having a first filter branch between a first filter input and a first filter output, the first filter branch having a first series connection of three inductances connected between the first filter input and the first filter output and wound onto three different legs of a three-leg filter core, a second filter branch between a second filter input and a second filter output, the second filter branch having a second series connection of three inductances connected between the second filter input and the second filter output and wound onto three different legs of the three-leg filter core, and a third filter branch between a third filter input and a third filter output, the third filter branch having a third series connection of three inductances connected between the third filter input and the third filter output and wound onto three different legs of the three-leg filter core, the input inductances or output inductances of the three filter branches being wound onto different legs of the three-leg filter core, wherein input inductances or output inductances of the three filter branches are wound onto different legs of the three-leg filter core; wherein the first filter branch includes a first shunt inductance; wherein the second filter branch includes a second shunt inductance; wherein the third filter branch includes a third shunt inductance; wherein a node where two inductances of the first series connection are connected is coupled to a first terminal of capacitive energy storage means via the first shunt inductance; wherein a node where two inductances of the second series connection are connected is coupled to a second terminal of the capacitive energy storage means via the second shunt inductance; wherein a node where two inductances of the third series connection are connected is coupled to a third terminal of the capacitive energy storage means via the third shunt inductance; and wherein the three shunt inductances are arranged on the three legs of the three-leg filter core, may have the step of passing on useful alternating currents from the first filter input to the first filter output and from the second filter input to the second filter output.

The central idea of the present invention is that it is of advantage to distribute several inductances which are part of a filter branch between a filter input and a filter output to different legs of a multi-leg filter core. It has been found out that such a distribution of the inductances results in a reduction in the effective voltage drop over the longitudinal branch of a filter. By the inventive distribution of the winding of a filter branch to at least two legs of a multi-leg filter core, a reduction or even elimination of individual flow components in the filter core can be achieved. This allows reducing the setup volume since the magnetic field energy stored in the filter core is reduced.

A reduction in the field energy is possible because the currents in the individual filter branches of the polyphase line filter have a predetermined phase relation relative to one another. Thus, the magnetic fluxes caused by the current infiltrating the individual inductances have a predetermined phase relation. If the magnetic field produced by currents in at least two filter branches superimpose one another, this may result in a reduction in the entire magnetic flux. However, if the magnetic flux through a inductance is reduced, the voltage drop across the inductance will also be reduced. The consequence as a whole is that the voltage drop across an inventive polyphase line filter is smaller than across a conventional line filter. The load dependence of the output voltage at the filter output and/or at the output of a rectifier downstream of the filter is also reduced. In addition, the setup size of the inventive polyphase line filter may be smaller than in conventional filter assemblies. Finally, the cost of a filter also decreases. Apart from that, the losses in the filter are reduced since the voltage drop as a whole is smaller.

Shunt inductances in the polyphase line filter may be formed by smaller wire thicknesses since the overall energy stored in the filter is smaller due to the inventive distribution of the longitudinal windings to several legs of the filter core. Thus, the energy to be stored in the shunt inductances decreases and the wire thicknesses can consequently be reduced. Similarly, capacitive energy storage means which are also part of a polyphase line filter may be implemented to be smaller since the energy to be provided by the capacitive energy storages is also smaller. Reduced capacitive energy storage means, however, result in a reduced capacitive reactive current in a no-load state of the polyphase line filter and/or under partial load conditions. Thus, switching off the capacitive energy storage means in no-load operation or in partial load operation becomes superfluous. This results in a considerable simplification in the filter and apparatus control, allowing a faster, cheaper setup of an apparatus comprising an inventive line filter.

In an embodiment, the polyphase line filter is implemented to pass on useful alternating currents of a predetermined frequency from the first filter input to the first filter output and from the second filter input to the second filter output and to attenuate at the first filter input or the second filter input disturbing currents of a frequency different than the predetermined frequency occurring at the first filter output or the second filter output. Such a design of the polyphase line filter is of advantage since it is assumed here that disturbing currents are produced by a consumer connected to the filter output and not to be passed on to the current supply network or mains coupled to the filter input. Thus, the focus of attention must be that disturbances, in particular harmonic currents and/or effects on mains, are not transferred from the filter output to the filter input. The undesired effects mentioned will subsequently simply be referred to as disturbances. An inventive line filter in contrast is implemented to pass on the useful alternating current, which typically has a frequency of 16⅔ Hz, 50 Hz, 60 Hz or 400 Hz, from the filter input to the filter output. Thus, supply for the consumer is ensured. A corresponding filter design allows any distorted current form, exemplarily also an approximately block-shaped current form, to be provided at the filter output, whereas the current consumption at the filter input is basically sinusoidal. The higher-frequency current portions necessary to produce current forms distorted compared to the sinus shape at the filter output are provided, when the filter is designed appropriately, by inductive and also by capacitive energy storage elements. In the inventive filter, consumers can be operated at nearly any input current form without impressing higher-frequency disturbing currents which are, for example, based on harmonic currents or different effects on mains of a consumer connected to a filter, in the input-side energy supply network. All these undesired current flows will subsequently be referred to as disturbing currents.

In another embodiment, a filter branch of the polyphase line filter includes a first inductance connected between the respective filter input and an internal node of the respective filter branch, a second inductance connected between the internal node and the respective filter output, and a third inductance which is part of a shunt branch and is connected to the internal node. The two longitudinal inductances connected between the filter input and the internal node and between the filter output and the internal node, respectively, are advantageously wound to different legs of the multi-leg filter core in a manner such that the input-side inductance of the second filter branch is wound to the same filter leg as the output-side inductance of the first filter branch. Coupling of the two filter branches belonging to two different phases of the network current supply is achieved by this arrangement. In an assembly described above, an advantageous T structure of the filter allowing good attenuation of output-side disturbances is connected to a coupling of at least two filter branches. It particularly becomes evident that no additional windings are necessary for producing the coupling between several filter branches compared to a conventional T filter structure. The inductance of the shunt circuit can still be wound to a suitable filter leg, wherein this may be both the leg on which the input-side winding is situated, and the leg on which the output-side winding is situated. The filter can be adjusted to the respective tasks and requirements by flexibly placing the windings.

In addition, it is advantageous for a capacitive energy storage means to be coupled in the shunt branch of a filter branch. In an embodiment it is coupled to the longitudinal branch via an inductance. A symmetrical layout of the different filter branches is of advantage so that a second and, if present, a third filter branch are coupled to the capacitive energy storage means. Capacitive energy storage means allows providing energy at times when the energy in the inductances is minimal. By introducing capacitive energy storages, the polyphase line filter is able to emit and/or receive another current component in addition to the supply current at the filter input so that non-sinusoidal output current forms may be achieved. Switching capacitive energy storage means into a shunt branch is still of advantage since a capacitance is able to short high-frequency current portions. Thus, the capacitance in the shunt branch reduces the transfer of high-frequency current portions from the filter output to the filter input. Especially in connection with an inventive filter concept in which inductances of several filter branches are coupled to one another by being mounted to a common leg of the filter core, the usage of capacitive energy storage elements is of particular advantage. The inductively stored energy is reduced by coupling the inductances. The result is that the capacitive reactive energy, too, in the filter can be reduced. Thus, the capacitive energy storage means can be made considerably smaller in connection with the inventively coupled inductances compared to conventional realizations. By a combination of capacitances and an inventive filter concept, the advantage can be achieved that the setup size of the capacitances can be reduced. This reduces the reactive power consumed by the capacitances in no-load operation and contributes to cost reduction.

Furthermore, it is possible to couple capacitive energy storage elements directly, i.e. without connecting a shunt inductance in between, to the nodes to which the different longitudinal inductances are coupled. Such a setup may be of advantage to achieve an even stronger attenuation of high-order harmonics. There is no more inductance connected in series to the capacitances. The capacitances may thus couple their energies directly to the longitudinal branch. Furthermore, the magnitude of the impedance of a capacitive element is very small at high frequencies. Thus, good dissipation of high-frequency currents at the output of the filter can be expected. The circuit structure, too, is simplified when shunt inductances connected between the longitudinal branch and the capacitive energy storage elements are no longer necessary.

Furthermore, it is advantageous for the polyphase line filter to be a three-phase line filter. Advantageously, a three-phase filter core is used here. There are three filter branches which each comprise a series connection of at least two inductances between the filter input and the filter output. The input-side and output-side inductances in this branch are each wound around different legs of the three-phase filter core. A three-phase layout has the great advantage that the polyphase line filter can be employed in connection with conventional three-phase supply networks. Furthermore, a three-phase layout is of advantage in that the phase relation predetermined by the three-phase supply network between the individual phases and thus between the currents in the individual filter branches allows coupling the filter branches and decreasing and/or eliminating flow components in the three-phase filter core in a particularly advantageous manner. In the three-phase filter, there are three phases shifted in phase position relative to one another by 120 degrees each. This applies to both the voltages and the currents and the magnetic fields generated by the currents. A superposition of all three phases here may result in a reduction of the magnetic field or the magnetic flux. A three-phase layout is particularly suitable to reduce the magnetic flux in the line filter, the result being a reduction in the energy stored in the filter and the mechanical setup size of the filter. The power dissipation, too, decreases with a sufficiently strong decrease in the magnetic fluxes. A three-phase layout of the filter, in connection with a conventional three-phase supply network, also results in an even network load, which is desirable from the point of view of energy supply companies. Thus, the three-phase layout of the line filter practically is the most important case of usage and results in considerable advantages.

In a three-phase line filter, it is advantageous for each of the three filter branches each to include three inductances connected in series between the respective filter input and the respective filter output, wherein the inductances of each branch are advantageously distributed to all three legs of a three-phase filter core. Thus, every filter branch is magnetically coupled to the other two filter branches. This results in a maximum symmetry of the arrangement. Coupling each branch to the other two branches is of particular advantage in a three-phase layout. The reason for this is the phase shift of 120 degrees between the individual branches. A coupling of a branch to only one other branch would, due to the phase relation between the two branches (phase difference 120 degrees), only result in a slight decrease in the magnetic flux and in a change in the phase position. If, however, one branch is coupled to the other two branches, this will result in a considerable decrease in the magnetic flux, the original phase position being maintained. The reduction in the magnetic flux here depends on the intensity of the coupling to the other two branches. It is thought to be of advantage to design the coupling intensity to the other two branches to be equal. In this case, maximum symmetry is ensured and phase deviations are avoided.

Advantageously, the inductances of the first, second and third filter branches comprise the same winding direction within a branch and also between the branches. Such a layout allows a current to be transferred from the filter input to the filter output at the smallest possible voltage drop and the smallest possible losses. A disturbing current in contrast which, exemplarily, represents a current harmonic or an effect on the mains and is coupled in at the filter output is to be dissipated via the shunt branch of the filter. This is made easier by the winding direction in that a current coupled in from the output will first pass the output-side inductances and then the shunt inductances in the opposite direction of turning. Thus, the effective inductance visible for a current coupled in from the output of the filter becomes minimal with a suitable layout of the winding direction. A useful current coupled in at the filter input, however, passes the input-side inductance and the inductance of the shunt branch in an equal direction. The effective inductance is thus maximized and the useful current is not shorted by the shunt branch but passed on to the output. In this regard, establishing the direction of winding is a considerable degree of freedom when designing a line filter. It has been recognized that using an equal direction of winding in all inductances is of advantage.

Furthermore, with a three-phase layout of the line filter it is also advantageous for the inductances in the individual filter branches to be designed as to their winding numbers and the distribution to the legs of the three-phase core such that the magnetic flux in a leg, referenced to a filter arrangement in which the inductances of a filter branch are wound to only one leg of the three-phase filter core, is reduced. As has been explained before, it is of advantage to design the filter such that the magnetic flux in the legs of the three-phase core is as small as possible. The mechanical setup size of the filter can be reduced in this way. At the same time, losses are reduced. In addition, the capacitive energy storage elements can be designed to be smaller.

In a three-phase line filter, it is also practical to couple capacitive energy storage means to nodes between the longitudinal inductances of every filter branch, which are connected in series between the filter input and the filter output. Coupling can take place either directly or via another inductance. Advantages of such a connection have already been discussed and will not be repeated here.

A star connection of capacitors or a triangular connection of capacitors may be advantageously used as energy storage means. Both types of connection are conventional in the field of energy technology and can be realized at justifiable expenses.

Furthermore, it is of advantage for the line filter to be implemented such that a current flowing at a predetermined useful frequency through the first, second or third terminal of the capacitive energy storage means to be of smaller magnitude than a fourth of the rated current and/or designed current flowing through the first, second or third filter input at a rated load of the filter. Such a design is only made possible by the inventive distribution of the longitudinal inductances of a filter branch to several legs of the multi-leg filter core. If the positive feedback of the individual windings is made use of, the current flowing in the shunt branch at the frequency of the useful current need only be comparatively small compared to conventional assemblies. The usage of a smaller current through the shunt inductance allows using a thinner wire than is conventionally the case. Thus, at the same setup size, considerably more windings can be used for the shunt inductance. Since the inductance with a predetermined core is proportional to the square of the number of windings, a considerably increased inductance of the shunt inductance can be achieved. According to the present circuit concept, this results in allowing the longitudinal inductances between the filter input and the filter output to be reduced. This saves both setup volume and expenses. Furthermore, by the inventive design of the current flowing in the energy storage means, the reactive current in no-load operation is reduced. Thus, switching off the capacitors in no-load operation or partial load operation is no longer necessary as is normal in conventional filter arrangements. Thus, a contactor is no longer necessary. This of course results in cost reduction. Furthermore, driving the switching means is also superfluous, reducing the expenses for setting up a line filter and allowing the filter to operated in connection with any consumer with no problems, without adjustments being necessary. Due to the current reduced by the inductive energy storage elements of the shunt branches compared to conventional arrangements, overcompensation is also reduced in no-load operation. Thus, the guidelines of the energy supply companies with regard to the network load can be kept to. Finally, a reduced current flow in the capacitive energy storage elements requires smaller capacitances, which in turn results in a reduction in setup volume and expenses.

BRIEF DESCRIPTION OF THE DRAWINGS

Preferred embodiments of the present invention will be detailed subsequently referring to the appended drawings, in which.

DETAILED DESCRIPTION

Figure 1:
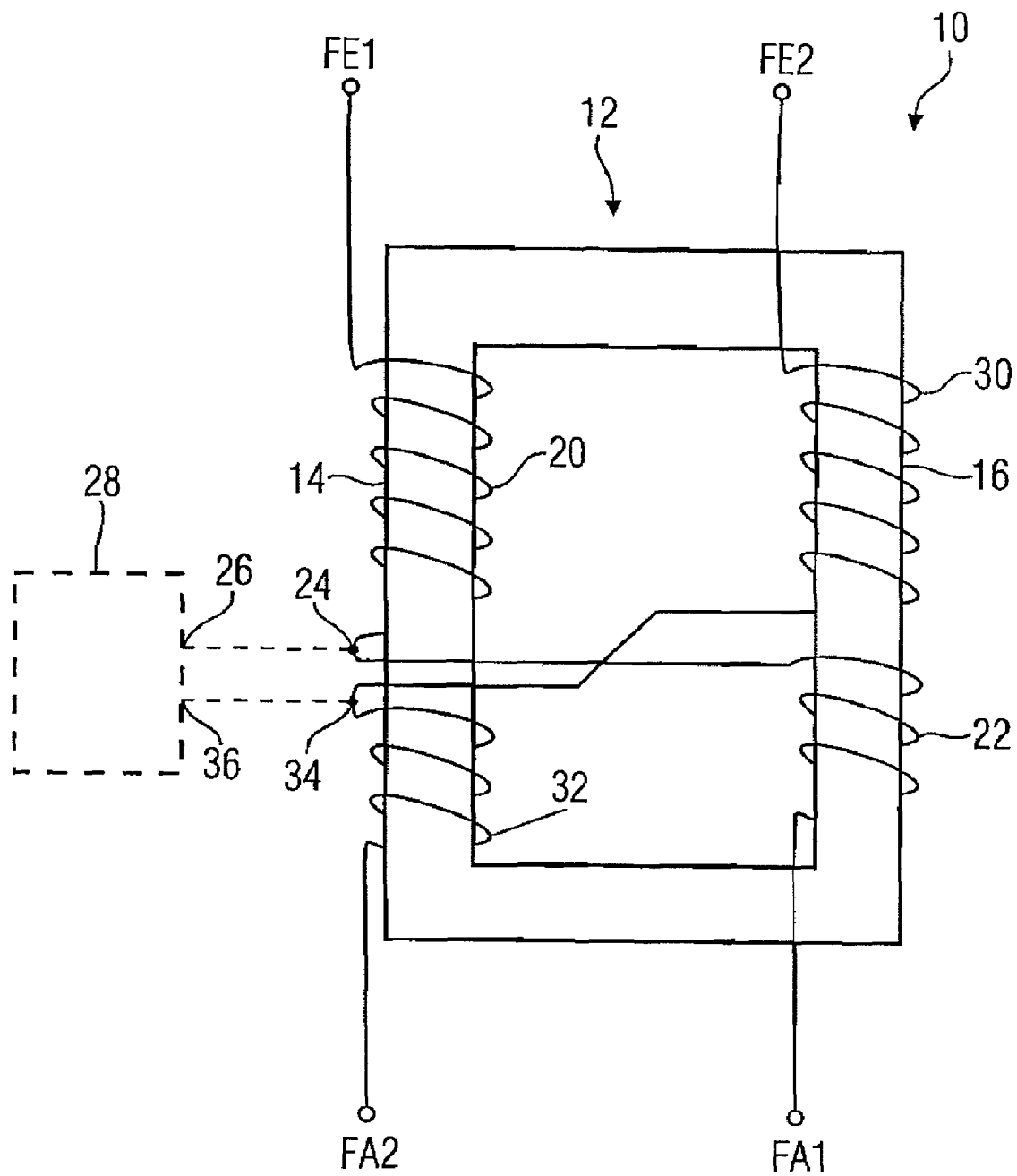
FIG. 1 is a schematic illustration of an inventive polyphase line filter according to a first embodiment of the present invention.

FIG. 1 shows a schematic illustration of an inventive polyphase line filter according to a first embodiment of the present invention. The polyphase line filter in its entirety is referenced by 10. The filter comprises a first filter input FE1 and a second filter input FE2, and a first filter output FA1 and a second filter output FA2. In addition, the filter comprises a polyphase filter core 12 including a first filter leg 14 and a second filter leg 16. A first inductance 20 is wound around the first filter leg 14 and is connected to the first filter input FE1 at the first end. The second end of the first inductance 20 is connected to the first filter output FA1 via a second inductance 22 wound around the second filter leg 16 of the polyphase filter core 12. The connection point 24 of the first inductance 20 and the second inductance 22 is connected to a first input 26 of a shunt branch circuit 28. The second filter input FE2 is connected to the second filter output FA2 via a third inductance 30 wound around the second leg 16 of the polyphase filter core 12 and a fourth inductance 32 wound around the first leg 14 of the polyphase filter core 12 and connected in series to the third inductance 30. The connective node 34 of the third inductance 30 and the fourth inductance 32 is connected to a second input 36 of the shunt branch circuit 28. It is also to be noted that all four inductances 20, 22, 30, 32 comprise the same direction of winding.

Continuing with the structural description, the mode of functioning of the present circuit will be described below. It is the task of the present circuit assembly to pass on currents of a predetermined frequency from the first filter input FE1 to the first filter output FA1 and from the second filter input FE2 to the second filter output FA2. Disturbing currents of other, in particular higher frequencies which may be impressed on the first and second filter outputs FA1, FA2 by a load not shown here are to be attenuated as far as possible so that they will only cause small disturbances (disturbing currents) at the filter inputs FE1, FE2. Additionally, the voltage drop across the line filter is to be as small as possible. In addition, it is to be noted that there is a phase shift between the currents in the first filter branch (between the first filter input FE1 and the first filter output FA1) and the second filter branch (between the second filter input FE2 and the second filter output FA2). This is established by the characteristics of a supply network coupled to the filter inputs FE1, FE2, and by the load connected to the filter outputs FA1, FA2.

If there is a current flowing through the first filter branch, it will impress a magnetic flux in the first leg 14 of the polyphase filter core 12 by the first inductance 20. A voltage drop across the inductance 20 forms by the inductive effect of the first inductance 20. In addition, the current flows through the second inductance 22 and thus also produces a magnetic field in the second leg 16 of the polyphase filter core 12. Also, a voltage drop across the second inductance 22 is the result. The shunt branch circuit 28 is designed such that the current flowing in at the useful frequency which is equal to the rated frequency of the supply network does not exceed a predetermined quantity. This is ensured by the internal coupling of the shunt branch circuit 28 which will not be explained in greater detail here. The circuit of the shunt branch circuit 28 may basically consist of inductances and capacitances which are implemented to represent a sufficiently large impedance at the rated frequency.

If a current continues flowing through the second filter branch, the third inductance 30 will produce a magnetic flux in the second leg 16 of the polyphase filter core 12. Again, a voltage drop across the third inductance 30 will be the result. In addition, a current flows through the fourth inductance 32 and contributes to the magnetic flux through the first filter leg 14.

If there is a phase shift between the currents in the first and second filter branches, there will be strong coupling between the inductances of the first and second filter branches. Exemplarily, the first inductance 20 produces a magnetic flux in the first filter leg 14 which in turn induces a voltage in the fourth inductance 32 of the second filter branch. If the phase difference between the currents in the first and second filter branches is sufficiently great, the voltage induced will counteract the voltage produced in the fourth inductance 32 by the current in the second filter branch. The voltage drop across the second filter branch thus decreases. Similarly, the voltage drop across the first filter branch decreases since, exemplarily, a voltage is induced in the second inductance 22 due to the magnetic flux through the second filter leg 16 caused by the current flow in the second filter branch via the third inductance 30. Considering the magnetic coupling of the four inductances 20, 22, 30, 32 in the filter branches shown, considering the phase shift between the first filter branch and the second filter branch, it shows that the voltage drop across the first filter branch and the second filter branch is reduced by the coupling.

Similarly, it can be shown that with a phase shift present between the currents in the first and second filter branches, the entire magnetic flux in the first filter leg 14 and the second filter leg 16 is reduced. This can exemplarily be recognized when assuming that the current in the first filter branch is opposite to the current in the second filter branch. Then, the first inductance 20 exemplarily produces a magnetic flux directed in a direction and the fourth inductance 32 produces a magnetic flux directed in the opposite direction. The entire magnetic flux in the filter leg 14, 16 thus is smaller than in an arrangement where there is no direct magnetic coupling between the first filter branch and the second filter branch.

Since the entire magnetic energy in the filter core in an inventive arrangement is smaller than in an arrangement in which there is no direct magnetic coupling between the filter branches, the filter core 12 can be designed to be correspondingly smaller. Since the energy stored in the first, second, third and fourth inductances 20, 22, 30, 32 is smaller than in conventional arrangements, the shunt branch circuit 28 only has to store a small amount of energy. For this reason, the devices of the shunt branch circuit 28 which basically includes inductances and capacitances can be designed to be smaller. This allows cost and structural space to be saved.

Thus, an inventive polyphase line filter 10 according to the first embodiment of the present invention offers the advantage that the voltage drop across the filter and the energy stored in the filter core 12 are smaller than in comparable conventional filter arrangements. The shunt branch circuit 28 of the line filter can also be designed to be smaller, which brings about further advantages.

Finally, it is to be pointed out that the filter shown may also be part of a larger filter arrangement which includes more than two inputs and outputs and in which the core comprises more than two legs.

Figure 2:
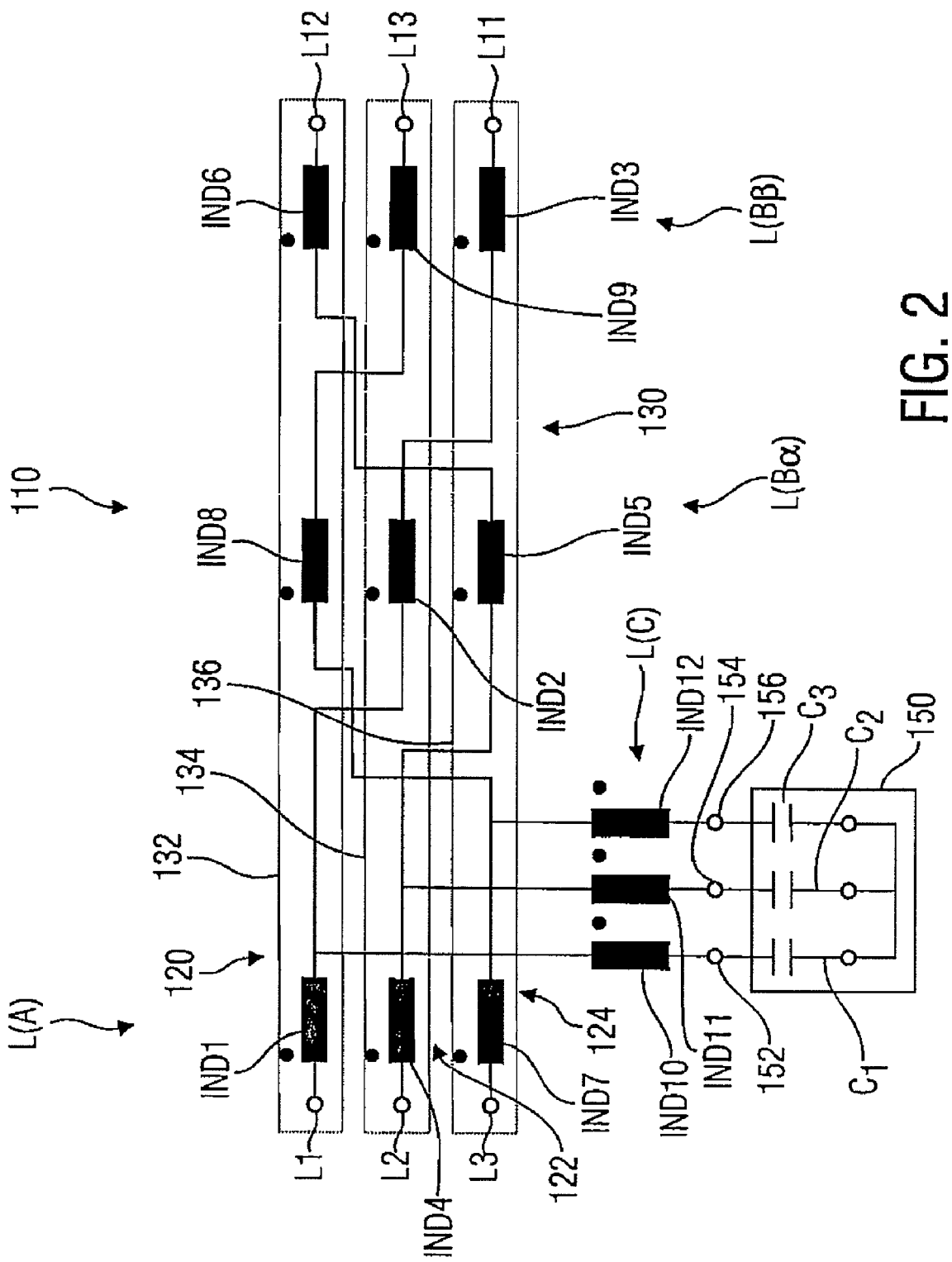
FIG. 2 shows a circuit diagram of an inventive broad-band line filter according to a second embodiment of the present invention.

FIG. 2 shows a circuit diagram of an inventive three-phase line filter according to a second embodiment of the present invention. The line filter in its entirety is referred to by 110. The filter includes a first filter branch 120 connected between the first filter input L1 and a first filter output L11, a second filter branch 122 connected between the second filter input L2 and the second filter output L12, and a third filter branch 124 connected between the third filter input L3 and the third filter output L13. In addition, the line filter 110 includes a three-leg filter core 130 comprising a first leg 132, a second leg 134 and a third leg 136. The three-leg filter core may advantageously be a three-phase filter core. The first filter branch includes a first inductance IND1, a second inductance IND2 and a third inductance IND3 connected in series between the first filter input L1 and the first filter output L11. The first inductance IND1 is wound around the first leg 132, the second inductance IND2 is wound around the second filter leg 134 and the third inductance IND3 is wound around the third filter leg 136. The second filter branch 122 is designed in analogy to the first filter branch, a fourth inductance IND4, a fifth inductance IND5 and a sixth inductance IND6 being connected between the second filter input L2 and the second filter output L12. The fourth inductance IND4 is wound onto the second leg 134, the fifth inductance L5 is wound onto the third leg 136 and the sixth inductance IND6 is wound onto the first leg 132. Finally, the third filter branch includes a seventh inductance IND7, an eighth inductance IND8 and a ninth inductance IND9 connected in series between the third filter input IND3 and the third filter output L13. The seventh inductance IND7 is wound onto the third leg 136, the eighth inductance IND8 is wound onto the first leg 132 and the ninth inductance IND9 onto the second leg 134. In addition, the three-phase line filter 110 includes shunt inductances IND10, IND11, IND12 and capacitive energy storage means 150 having a first terminal 152, a second terminal 154 and a third terminal 156. The tenth inductance IND10 is associated to the first filter branch 120. It is connected to a node at which the first inductance IND1 and the second inductance IND2 are coupled to each other. In addition, the tenth inductance IND10 is connected to the first terminal 152 of the capacitive energy storage means 150. Similarly, the second filter branch 122 includes an eleventh inductance IND11 connected between the node where the fourth inductance IND4 and the fifth inductance IND5 are connected to each other, and the second terminal 154 of the capacitive energy storage means 150. Finally, the third filter branch 124 includes a twelfth inductance IND12 connected between the common node of the seventh inductance IND7 and the eighth inductance IND8 and the third terminal 156 of the capacitive energy storage means 150. The capacitive energy storage means 150 includes three capacitors C1, C2, C3 connected in a star connection.

In addition, it is to be noted that the mechanical arrangement of the individual inductances and the direction of winding are predetermined. On the first leg 132, the first inductance IND1, the eighth inductance IND8 and the sixth inductance IND6 are applied in this order. The second leg 134 carries the fourth inductance IND4, the second inductance IND2 and the ninth inductance IND9. Finally, the third leg carries the seventh inductance IND7, then the fifth inductance IND5 and finally the third inductance IND3. The direction of winding of all inductances is selected to be the same. The precise wiring of the inductances including the direction of winding can be seen in FIG. 2.

Furthermore, it is to be pointed out that the first, second and third inputs L1, L2 and L3 serve as mains connections. The first, second and third filter outputs L11, L12, L13 serve as apparatus connecting points. It is assumed for the further discussion that the line filter 110 is designed to be symmetrical for all phases. Thus, the input-side inductances IND1, IND4, IND7 will in the following explanations uniformly be referred to as inductance L(A). The inductances IND2, IND5, IND8 downstream of the input inductances IND1, IND4, IND7 are also designed to be the same and will subsequently be referred to as inductance $L(B_\alpha)$. The output-side inductances IND3, IND6, IND9 are referred to as inductance $L(B_\beta)$. Finally, the shunt inductances IND10, IND11, IND12 are collectively referred to as inductance L(C).

Subsequently, the basic mode of functioning and the calculation of a harmonic filter will be described. This is shown referring to the three-phase line filter 110 according to FIG. 2. Of course, it is also possible to understand or check different variations of the circuit assembly in analogy to the circuit described here.

Subsequently, the calculation of the filter will be discussed at first. As a starting point for the calculation, the voltage drop across the longitudinal inductance $L_A$ as a relative shorting voltage $u_K$ is to be established. The $u_K$ value of $L_A$ can be chosen within a wider range. Typically, the values should be between 10% and 30%. Generally, it applies that increasing the longitudinal inductance $L_A$ can result in an improvement in the entire THDI value (total harmonic distortion at the input). Increasing the longitudinal inductance $L_A$ also brings about a higher voltage drop across the entire filter and thus capacitance value changes.

The input-side inductance $L_A$ which is also referred to as L(A) is calculated from the predetermined rated current of the harmonic filter 110. Given the ratios $L_A/L_B>1$ and $L_A/L_C>1$, the remaining inductance values of the inductances $L_B$ and $L_C$ can be calculated. Here, $L_B$ is the output-side longitudinal inductance of the filter and $L_C$ is the shunt inductance of the filter 110. The output-side longitudinal inductance here is subdivided into two inductances $L_{B\alpha}$ and $L_{B\beta}$. It is to be pointed out here that $L_{B\alpha}$ is also referred to as $L(B\alpha)$, and $L_{B\beta}$ as $L(B\beta)$. The inductance $L_A$ and the ratios $L_A/L_B$ and $L_A/L_C$ may exemplarily be established using empirical findings. The quantities established are at first guide quantities to indicate a suitable three-phase iron core. The setting of the ratios $L_A/L_B$ and/or $L_A/L_C$ can be optimized by means of computer simulation. Depending on the application, different ratios are to be chosen.

The energy contents required of a three-phase iron core choke can be calculated from the three inductance values $L_A$, $L_B$ and $L_C$, $L_B$ consisting of $L_{B\alpha}$ and $L_{B\beta}$. This is where all the considerable advantages of the invention become obvious. The entire energy contents necessary equals the difference of the square of the rated current $I_r$ multiplied by the input-side inductance $L_A$ and the square of the rated current $I_r$ multiplied by the output-side inductance $L_B$, plus the square of $0.25 \times I_r$ multiplied by $L_C$. This is true although the current flowing through the two output-side inductances $L_{B\alpha}$ and $L_{B\beta}$ in reality is somewhat smaller than the rated current $I_r$ (input current) of the harmonic filter. The reduction of the effective energy contents of a choke in which the input-side inductance $L_A$ of a filter branch is wound onto a leg of a three-phase iron core and in which the windings of the output-side inductances $L_{B\alpha}$, $L_{B\beta}$ are applied onto the other legs of the three-phase iron core can be recognized from this calculation. Partly eliminating flow components results in an overall energy content required smaller than in an embodiment in which the input-side inductance $L_A$ and the output-side inductance $L_B$ of a filter branch are wound onto the same leg of a three-phase iron core. In an inventive distribution of the windings, the result will be a difference of $I_r\hat{\ }2*L_A$ and $I_r\hat{\ }2*L_B$ forming.

A correct core size for the three-phase iron core can be selected using the data obtained in this way. The calculation of the $A_L$ value is known from literature and will not be explained here. If the $A_L$ value of the iron core is known, the actual calculation of the line filter 110 can be performed.

For the calculation, the filter arrangement will be described in both a π equivalent circuit diagram and in a T equivalent circuit diagram. The inductances $L_A$, $L_{B\alpha}$, $L_{B\beta}$ and $L_C$ are arranged in T circuits. They can be recalculated to the inductances in the π circuit, the inductances of the π circuit being referred to as $L_X$ (longitudinal inductance), $L_Y$ (first shunt inductance) and $L_Z$ (second shunt inductance). The following is true:

$$L_X=(N_X)\hat{\ }2*A_L$$

$$L_X=(N_Y)\hat{\ }2*A_L$$

$$L_X=(N_Z)\hat{\ }2*A_L \quad (1)$$

$N_X$, $N_Y$, $N_Z$ being the winding numbers of the inductances $L_x$, $L_y$, $L_z$ recalculated in the π circuit.

In addition, it is possible to recalculate the winding numbers $N_x$, $N_y$, $N_z$ of the inductances in the π circuit to the winding numbers $N_A$, $N_{B\alpha}$, $N_{B\beta}$ and $N_C$ of the inductances in the T circuit:

$$N_X = N_A - \sqrt{0.5}*N_{B\alpha} - \sqrt{0.5}*N_{B\beta}$$

$$N_y = N_A + N_C$$

$$N_z = \sqrt{0.5}*N_{B\alpha} + \sqrt{0.5}*N_{B\beta} + N_C \quad (2)$$

$N_A$, $N_{B\alpha}$, $N_{B\beta}$ and $N_C$ being the winding numbers of the inductances $L_A$, $L_{B\alpha}$, $L_{B\beta}$ and $L_C$ disposed in the T circuit.

The inductances $L_A$, $L_{B\alpha}$, $L_{B\beta}$ and $L_C$ of the T circuit can be calculated from the inductances $L_x$, $L_y$ and $L_z$ of the π circuit using the subsequent equation:

$$L_A = 0.5*(L_X + L_Y - L_Z)$$

$$L_{B\alpha} = (L_z - L_Y + (0.5*(L_x + L_y - L_z)))/2$$

$$L_{B\beta} = (L_Z - L_Y + (0.5*(L_x + L_y - L_z)))/2$$

$$L_C = L_Y - (0.5*(L_X + L_Y - L_Z)) \quad (3)$$

Assuming that the inductances of the T circuit $L_A$, $L_{B\alpha}$, $L_{B\beta}$ and $L_C$ are known, the inductance values of a π circuit can be determined by inversion of formula (3). Using formula (1), the winding numbers $N_X$, $N_Y$, $N_Z$ of the inductances in the π circuits can be determined. Finally, the system of equations (2) can be inverted to calculate the winding numbers $N_A$, $N_B$, $N_C$ of the inductances in the T circuits. Thus, all inductances of the multiple winding choke have been established unambiguously.

The advantage of the invention can be understood easily using the calculation shown and/or this calculating example. Not only the smaller required energy contents already described results in a considerable reduction in the setup size, but also the utilization of the positive feedback of the individual windings. This is why the number of windings $N_C$ of the shunt inductance $L_C$ can be set to be relatively high. In an inventive line filter, this does not to the same extent result, as has been the case in conventional arrangements, in a choke greater as to the setup volume, since a smaller wire cross-section can be used for the shunt inductance $L_C$ than for the remaining input-side and output-side inductances. Using another wire cross-section and/or the reduced setup volume of the shunt inductance results from the considerably smaller current flowing into the shunt branch of the harmonic filter. Since only the harmonic currents and the capacitive reactive current of the capacitor at the useful frequency (typically 50 Hz or 60 Hz) flow in the shunt branch of the harmonic filter and thus through the winding of the inductance $L_C$, the effective value of the current is reduced to about 25% of the rated current $I_r$ of the filter. The fact that only 25% of the rated current $I_r$ flow in the shunt inductance $L_C$ has the result that the overall energy of the multiple winding choke is smaller than in a conventional filter design, since $(0.25*I_r)^2*L_C$ is true.

Assuming currents in the shunt branch which are about 25% of the rated current $I_r$ is valid for a design of the filter to an overall THDI value (total harmonic distortion at input) of around 8%, i.e. in the values resulting from such a design for the inductances $L_A$, $L_{B\alpha}$, $L_{B\beta}$ and $L_C$ and the corresponding capacitance coupled to the inductance $L_C$. With a different design of the line filter, the current in the shunt branch will vary correspondingly.

Figure 10:
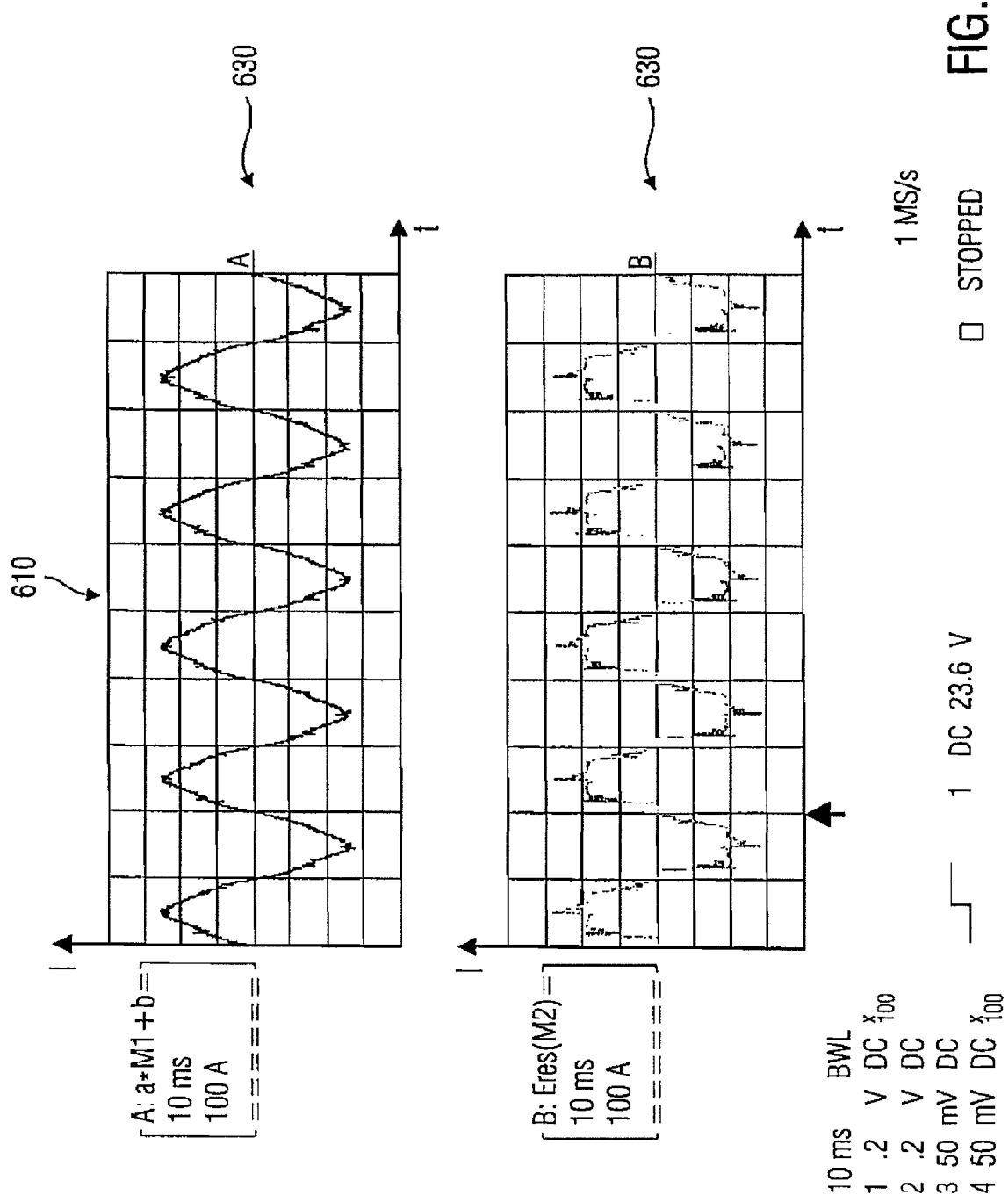
FIG. 10 shows an oscillogram of the current forms at the input and the output of the inventive line filter according to the second embodiment of the present invention.

Basically, the input current of the harmonic filter is nearly sinusoidal, corresponding to the field of employment and the task of the filter. The output current of the filter is a current having a basically block-shaped form, as is shown in FIG. 10. Knowing the input current and the output current, the result is the current which has to flow in the shunt branch of the filter. The current flow in the shunt branch of the filter, i.e. through the inductance $L_C$, consists of several portions. One of these portions is the capacitive current caused by the capacitance in the shunt branch at the rated frequency (typically 50 Hz or 60 Hz) of the filter flowing via the choke $L_C$ to the capacitor coupled thereto. The effective value $I_{C\_50\,Hz}$ of this current can be calculated using the formula (5) indicated below.

Under load conditions, the difference current between the input current and the output current of the filter is added to this current still sinusoidal in no-load operation of the filter, so that the result will be an extremely non-sinusoidal current form. This in turn means that the energy to be transferred of the filter during the gap times of the output current must come from the capacitances connected in the shunt branch of the line filter. This circumstance is a consequence of the output current being nearly block-shaped.

In addition, when designing the filter it must be kept in mind that the capacitances in the shunt branch must not be selected to be too great to avoid an increased capacitive reactive current in the shunt branch. When designing the harmonic filter to a THDI value of 8%, using values for the inductances $L_A$, $L_{B\alpha}$, $L_{B\beta}$ and $L_C$ calculated for a rated operation, the capacitance required for energy-bridging is calculated from the total effective value of the current in the shunt branch:

$$I_q = 0.25 * I_r \quad (4)$$

$$I_{C\_50\,Hz} = 0.5 * I_q = 0.125 * I_r \quad (5)$$

$$C_Y = I_{C\_50\,Hz}/(2*pi*f*U_{CY}) = 0.125*I_r/(2*pi*f*U_{CY}) \quad (6)$$

$$C_\Delta = C_Y/3 \quad (7)$$

Here, $I_q$ is the current in the shunt branch of the harmonic filter, $I_{C\_50\,Hz}$ is the capacitive fundamental oscillation current in the filter capacitor with a star connection of the capacitors, $C_Y$ is the capacity of the capacitors required in star connections, $C_\Delta$ is the capacitance of the capacitors required in triangular circuits, $U_{CY}$ is the voltage drop across a capacitor in a star connection in the shunt branch and f is the rated frequency of the line filter.

The capacity calculated, with the assumptions indicated above, is sufficient for the defined filter effect since this capacitance value stores the very energy required during the time interval in which the output current forms "gaps". By increasing the filter capacitances, slight improvements in the THDI value can be achieved, however, other disadvantages occur which make such an increase in the capacitor value mostly appear undesirable.

The fine tuning between the individual inductances of the multiple choke and the size of the capacitor provides for an optimum filter effect. However, the principle effect of the harmonic filter is uninfluenced by this fine tuning, even with extremely unfavorable selected inductance ratios among one another and/or in connection with the filter capacitor coupled thereto. This means that the actual invention, namely eliminating flow components in the three-phase iron core by the appropriate arrangement of the windings on the three-phase core, in principle will always remain and always result in a choke reduced in setup volume. The overall setup volume and the capacitance values necessary, however, can be reduced further by means of an optimized filter adjustment. Computer-aided simulations and very precise measuring equipment may serve as an aid here.

When looking at the input and output currents of the filter exemplarily illustrated in FIG. 10 in greater detail, another advantage of the inventive line filter assembly becomes obvious. The current flowing in a connected consumer, advantageously an appliance having an internal B6 rectification and capacitor smoothing, provides for a very small ripple current in the internal smoothing capacitors of the consumer due to its block-shaped form. In particular when connecting driving systems, this results in an increased lifetime of the electrolytic capacitors installed and thus in a longer lifetime of the appliance.

The advantages of an inventive circuit can thus be recognized by means of an analysis of an inventive line filter 110, wherein in particular the fact is made use of that a single-phase equivalent circuit diagram can be constructed by means of well-known methods relative to a three-phase circuit assembly. Here, the possibility of converting π circuits to T circuits and vice versa has been made use of.

Figure 3:
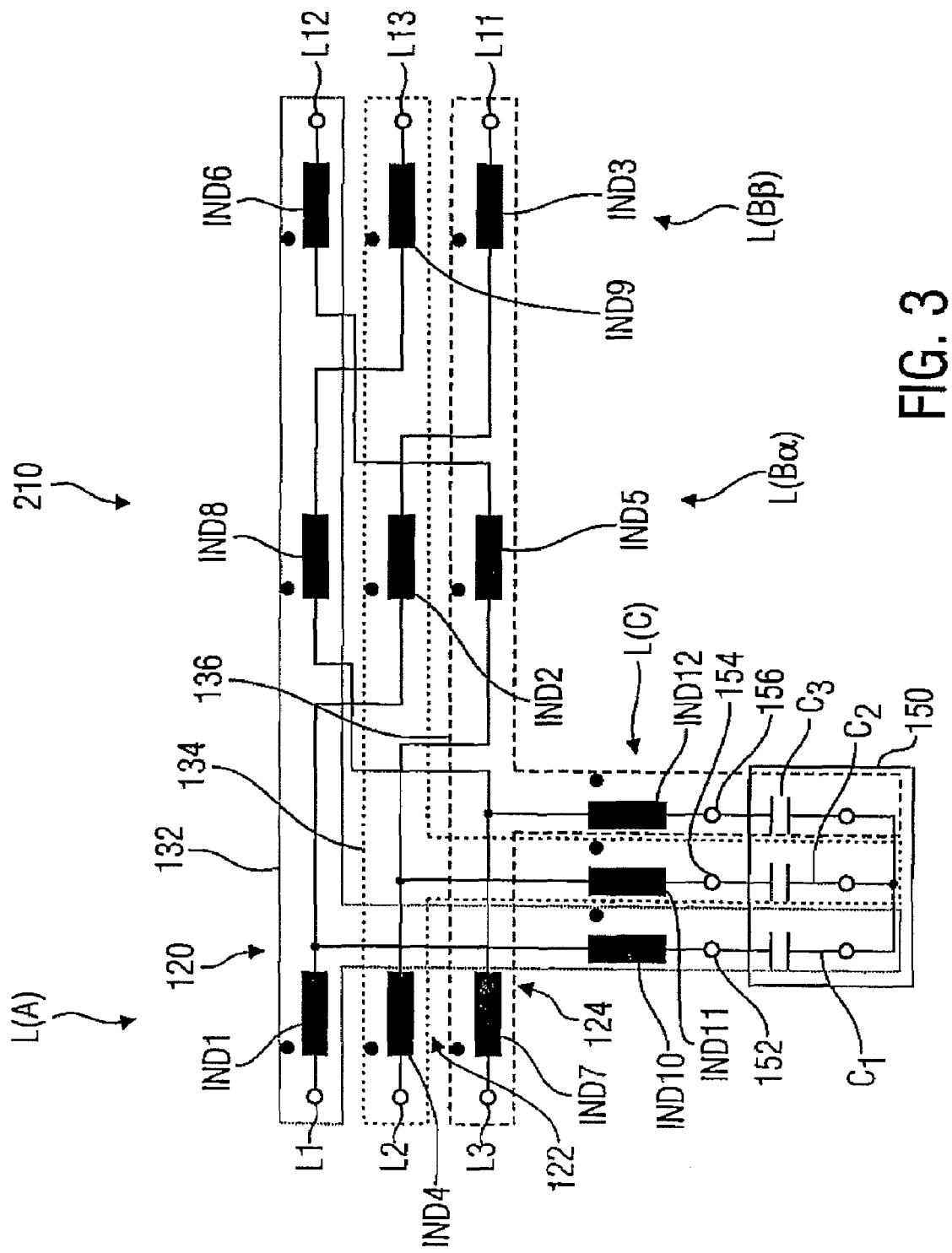
FIG. 3 shows a circuit diagram of an inventive three-phase line filter according to a third embodiment of the present invention.

FIG. 3 shows a circuit diagram of an inventive three-phase line filter according to a third embodiment of the present invention. The line filter, in its entirety, is referred to by 210. The setup and mode of functioning of the line filter 210 only differ slightly from the setup and mode of functioning of the line filter 110 shown in FIG. 2, so that only differing features will be described here. In particular, it is to be pointed out that same reference numerals will here and in all following figures refer to same elements.

FIG. 3 particularly shows the geometrical assembly of shunt inductances IND10, IND11, IND12 on the legs of the filter core. The shunt inductance IND10 corresponding to the first filter branch 120 here is wound onto the first leg 132. The shunt inductance IND11 corresponding to the second filter branch 122 is wound onto the second leg 124 of the filter core. The shunt inductance IND12 corresponding to the third filter branch 134 is wound onto the third leg 136 of the filter core. Such a winding has the result that the shunt inductances IND10, IND11, IND12 are strongly coupled to the input-side longitudinal inductances IND1, IND4, IND7 of the respective filter branches. Since the shunt inductances IND10, IND11, IND12 comprise the same direction of winding as the corresponding input-side longitudinal inductances IND1, IND4, IND7, the input-side longitudinal inductances IND1, IND4, IND7 and the shunt inductances IND10, IND11, IND12 are connected in series regarding an input current flowing into the filter at the filter inputs L1, L2, L3 and thus represent a high inductance. This reduces the dissipation of the input current via the shunt branch and thus reduces reactive currents emerging in the line filter 210.

The further mode of functioning of the filter 210 remains unchanged relative to the filter 110 shown in FIG. 2 so that a description thereof is omitted.

Figure 4:
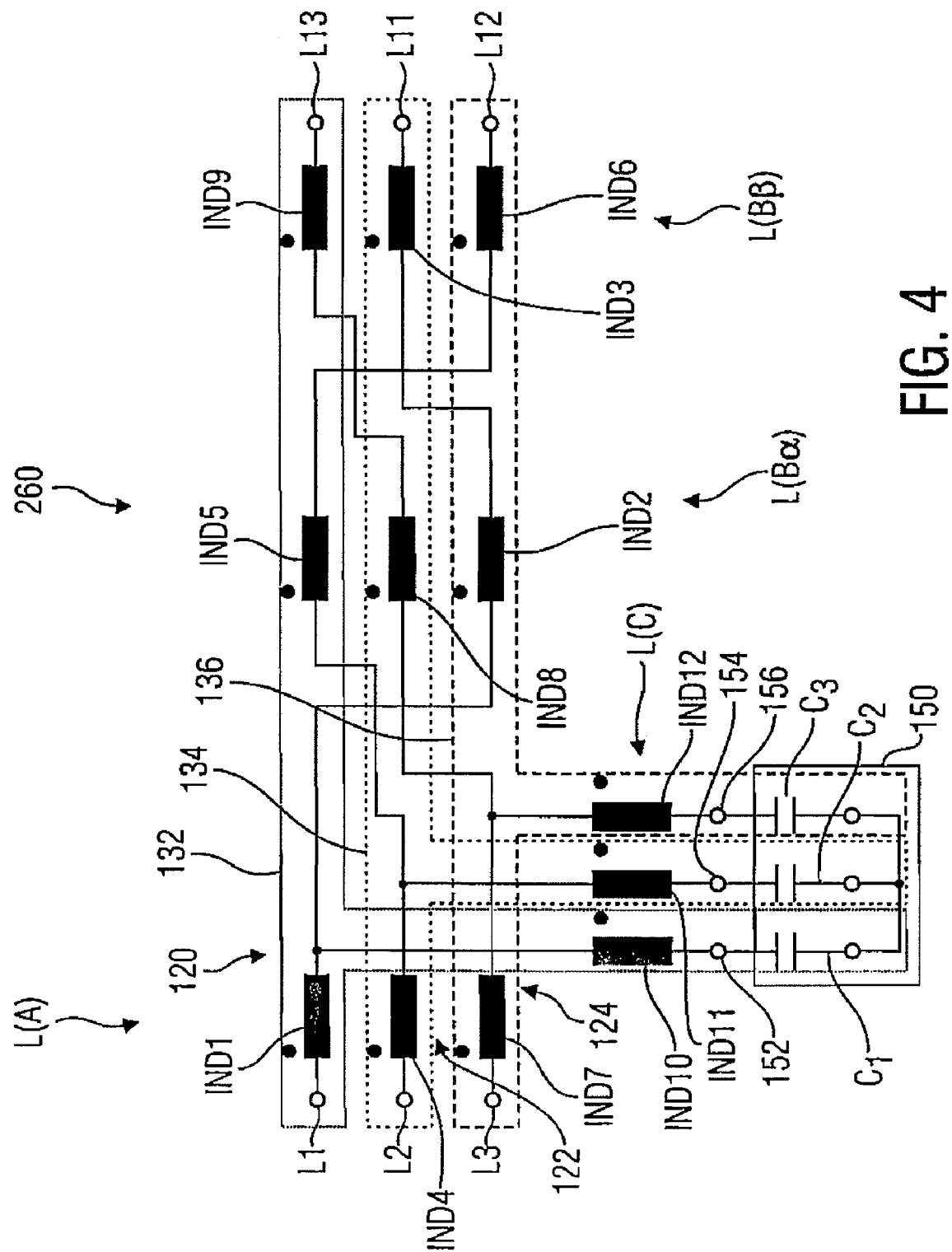
FIG. 4 shows a circuit diagram of an inventive three-phase line filter according to a fourth embodiment of the present invention.

FIG. 4 shows a circuit diagram of an inventive three-phase line filter according to a fourth embodiment of the present invention. This is very similar to the filters shown in FIGS. 2 and 3 so that only the differences will be described here. The line filter 210 shown in FIG. 3 will be used here as a reference for the description. The present line filter is referred to by 260. Again, same reference numerals indicate same units like in the embodiments described before.

The structure of the line filter 260 remains unchanged compared to the line filter 210. Only the mechanical position of the output-side inductances IND2, IND5, IND8 and IND3, IND6, IND9 on the legs 132, 134, 136 of the filter core is different. The order of the inductances referenced to the current flow from the filter input to the filter output thus remains unchanged in the filter 260 compared to the filter 210. Thus, exemplarily, inductances IND1, IND2 and IND3 in this very order are disposed in the first filter branch 120 between the filter input L1 and the filter output L11. A similar situation applies to the second filter branch 122 and the third filter branch 124. However, what is changed in the line filter 260 compared to the line filter 210 is the mechanical arrangement of the inductances on the filter legs. In an unchanged manner, however, the inductances IND1 and IND10 are on the first filter leg 132, the inductances IND4 and IND11 are on the second filter leg and the inductances IND7 and IND12 are on the third filter leg. However, what is changed is the arrangement of the output-side inductances. The inductance IND2 of the first filter branch now is on the third filter leg 136 and the inductance IND3 of the first filter branch 120 is on the second filter leg 134. In addition, what is changed is the arrangement of the inductance IND5 of the second filter branch 122 which in the filter 260 is wound onto the first leg 132, and the inductance IND6 of the second filter branch 122 which is now wound onto the third leg 136. Finally, the inductance IND8 of the third filter branch 124 is wound onto the second leg 134 and the inductance IND9 onto the first leg 132.

A changed mechanical arrangement of the inductances on the filter legs leaves the characteristics of the line filter 260 essentially unchanged, but represents another embodiment which may be of mechanical advantage, depending on the circumstances.

Figure 5:
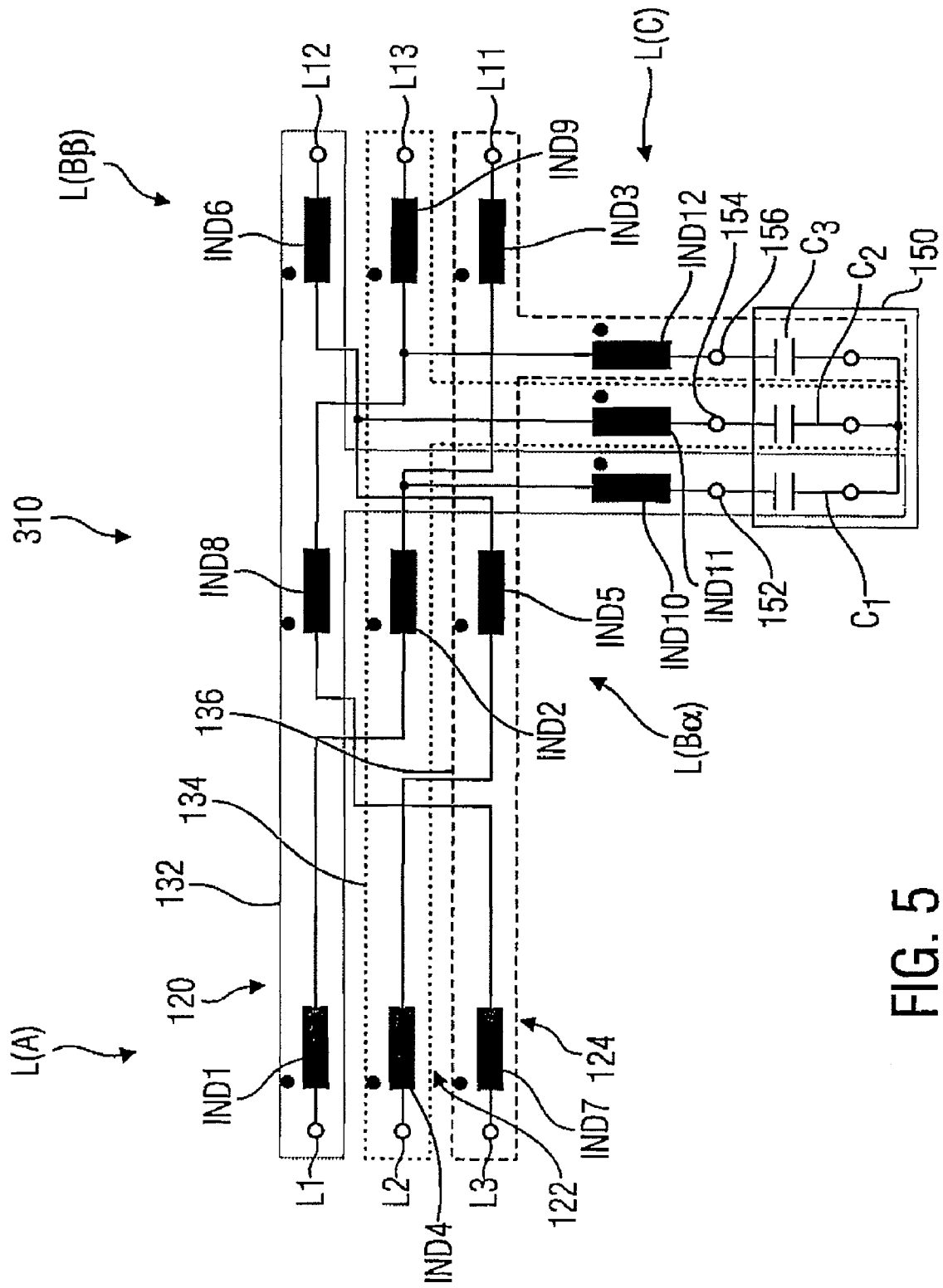
FIG. 5 shows a circuit diagram of an inventive three-phase line filter according to a fifth embodiment of the present invention.

FIG. 5 shows a circuit diagram of an inventive three-phase line filter according to the fifth embodiment of the present invention. The line filter shown in its entirety is referred to by 310. The line filter 310, too, is very similar with regard to setup and mode of functioning to the line filter 210 shown in FIG. 3. Thus, only the differences will be explained below. Same reference numerals again designate same elements.

In the line filter 310, coupling of the shunt branch does not take place between the first and second inductances IND1, IND2; IND4, IND5; IND7, IND8 of each filter branch (counted starting from the filter input), but between the second and third inductances IND2, IND3; IND5, IND6; IND8, IND9. The first filter branch 120 is to be taken for a more detailed discussion. The shunt inductance IND10 of the first filter branch 120 is now coupled between the inductance IND2 and the inductance IND3. As to further wiring, in particular the distribution of the inductances to the legs, there are no differences between the line filters 210 and 310.

The line filters 210 and 310 do not differ considerably as to their basic characteristics. However, differences may arise in dimensioning, i.e. the design of the inductances and/or capacitances. Depending on the requirements and the mechanical circumstances, a filter arrangement 210 according to FIG. 3 or a filter arrangement 310 according to FIG. 5 may be of greater advantage.

Figure 6:
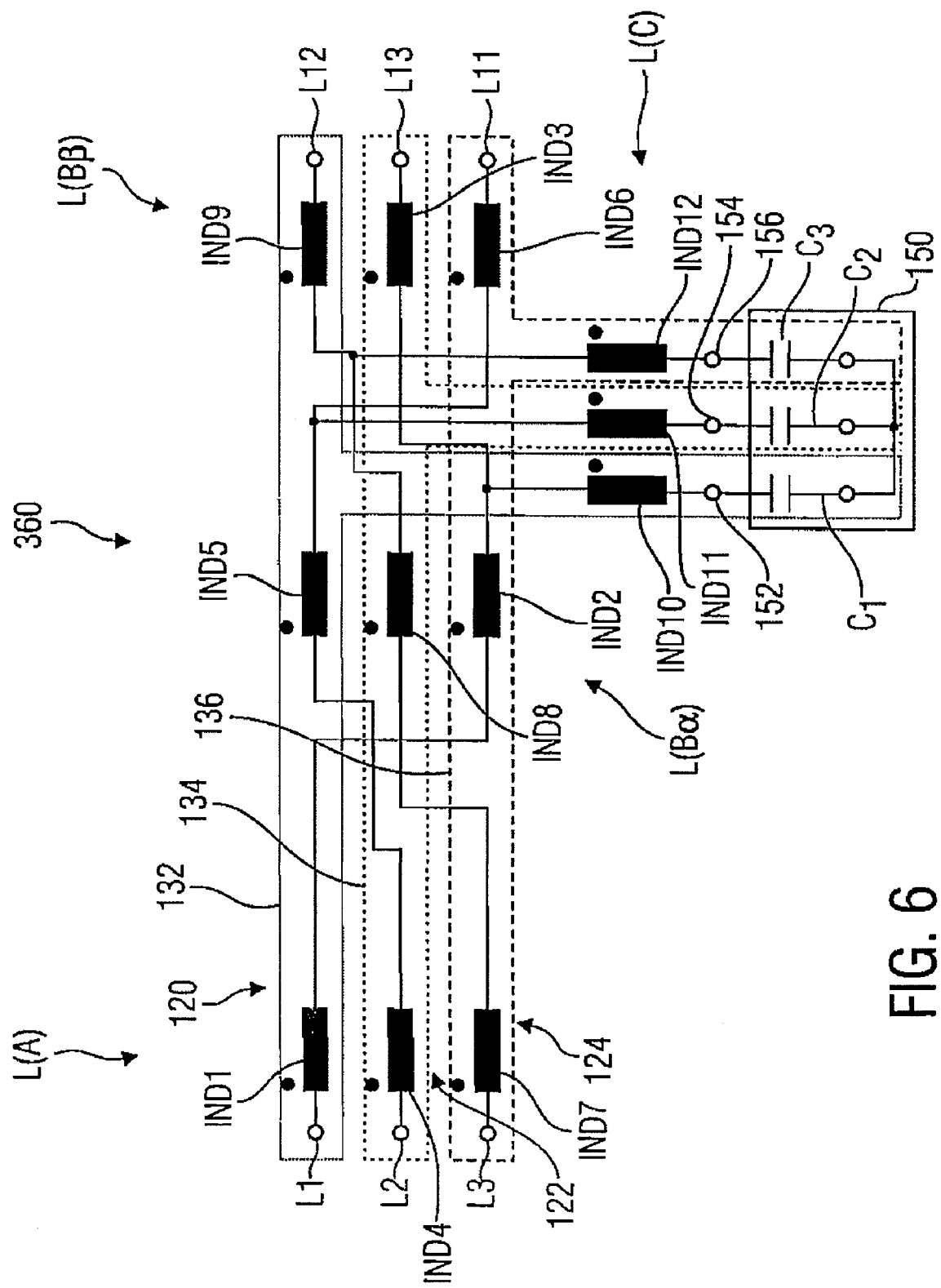
FIG. 6 shows a circuit diagram of an inventive three-phase line filter according to a sixth embodiment of the present invention.

FIG. 6 shows a circuit diagram of an inventive three-phase line filter according to a sixth embodiment of the present invention. As to its basic setup and its mode of functioning, the filter corresponds to the filters shown in FIGS. 2 to 5, so that again reference is made to the description thereof. Same reference numerals characterize same elements like in the line filters described before. The line filter shown in FIG. 6 is referred to in its entirety by 360. As to the distribution of the inductances on the filter cores, it corresponds to the line filter 260 shown in FIG. 4. However, the shunt branches, similarly to the line filter 310 described in FIG. 5, branch off between the second and third inductances IND2, IND3; IND5, IND6; IND8, IND9 of every filter branch 120, 122, 124.

Again, such an embodiment represents an alternative to the filter 260 shown in FIG. 4 and the filter 310 shown in FIG. 5. The characteristics basically remain unchanged, however different dimensioning of the inductances and capacities is required again.

Figure 7:
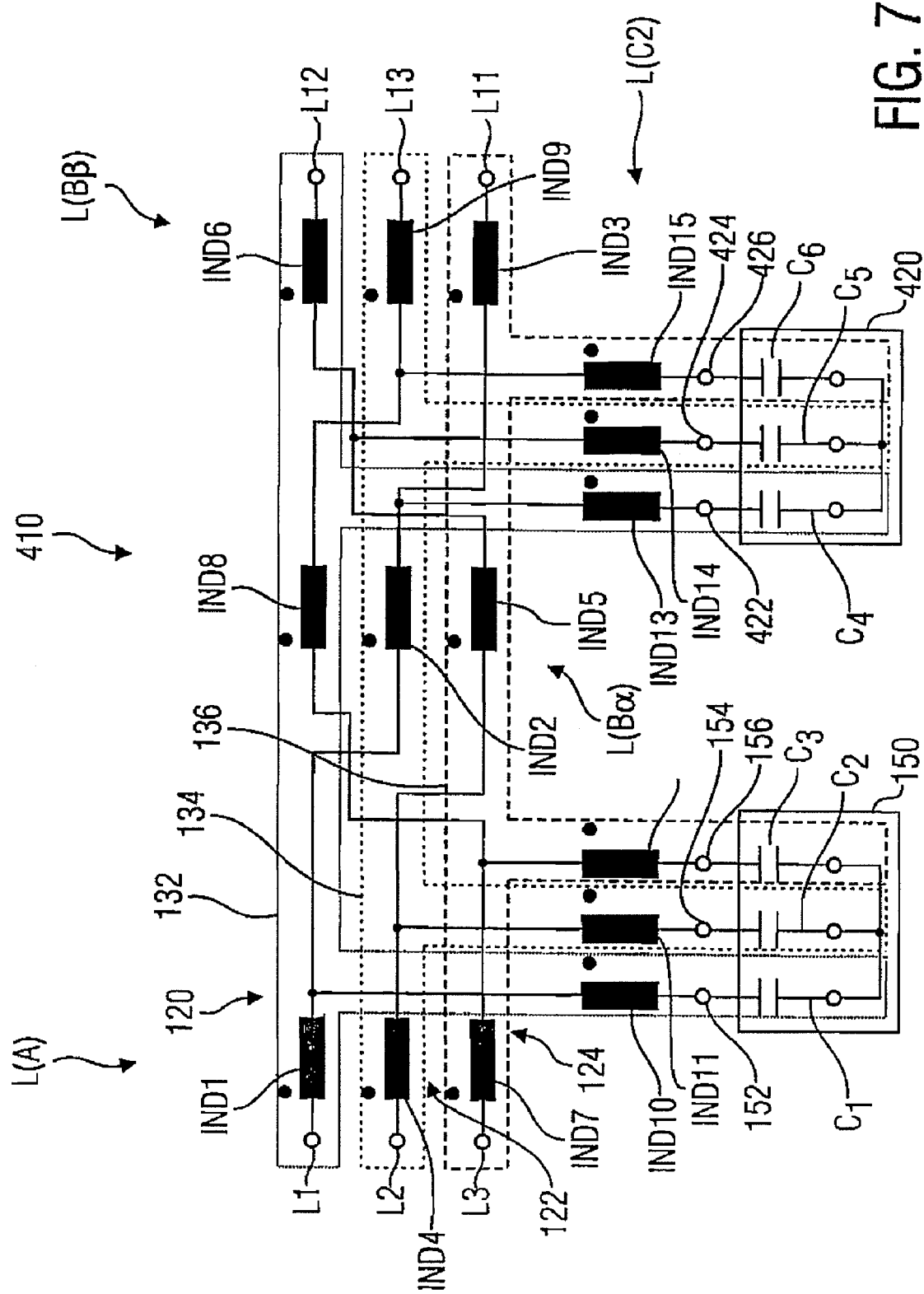
FIG. 7 shows a circuit diagram of an inventive three-phase line filter according to a seventh embodiment of the present invention.

FIG. 7 shows a circuit diagram of an inventive three-phase line filter according to a seventh embodiment of the present invention. The filter, in its entirety, is referred to by 410 and is based on the filter 210 shown in FIG. 3. Same reference numerals again characterize same elements. Characteristics of the filter 410 remaining unchanged compared to the filter 210 are not described again. Rather, reference is made to the description of the filter 210 and/or the filter 110.

Compared to the filter 210, the filter 410 is supplemented by introducing a second shunt branch. This includes the inductances IND13, IND14 and IND15 and second capacitive energy storage means 420 including three capacitances C4, C5, C6. The second capacitive energy storage means 420 comprises a first terminal 422, a second terminal 424 and a third terminal 426. Also, it is to be pointed out that the inductances of the first shunt branch will in summary be referred to as L(C1), whereas the inductances IND13, IND14 and IND15 of the second shunt branch will in summary be referred to by L(C2). The inductance IND13 of the second shunt branch is connected to the node point between the second inductance IND2 and the third inductance IND3 of the first filter branch 120 and to the first terminal 422 of the second capacitive energy storage means 420. The inductance IND13 of the second shunt branch of the first filter branch 120 is wound onto the first leg 132. The direction of winding here is the same as in all other inductances.

In analogy to the inductance IND13 of the first filter branch, the inductances IND14 and IND15 of the second and third filter branches are connected and wound onto the second and third legs 134 and 136, respectively, of the three-phase filter core. The details of the connection can be seen in FIG. 7.

A line filter 410 comprising a second shunt branch may be designed to achieve a better filter effect than a line filter having only one filter branch. In particular, the shunt branches can be dimensioned to suppress two undesired frequencies. All in all, there are more degrees of freedom in the filter design since the filter is of a higher filter order. Thus, the complexity for realizing a line filter having two shunt branches is increased, since additional shunt inductances IND13, IND14, IND15 and additional capacitances C4, C5, C6 are necessary. However, depending on the requirements, it is practical to use a filter having only one shunt branch or a filter 410 having two shunt branches.

Figure 8:
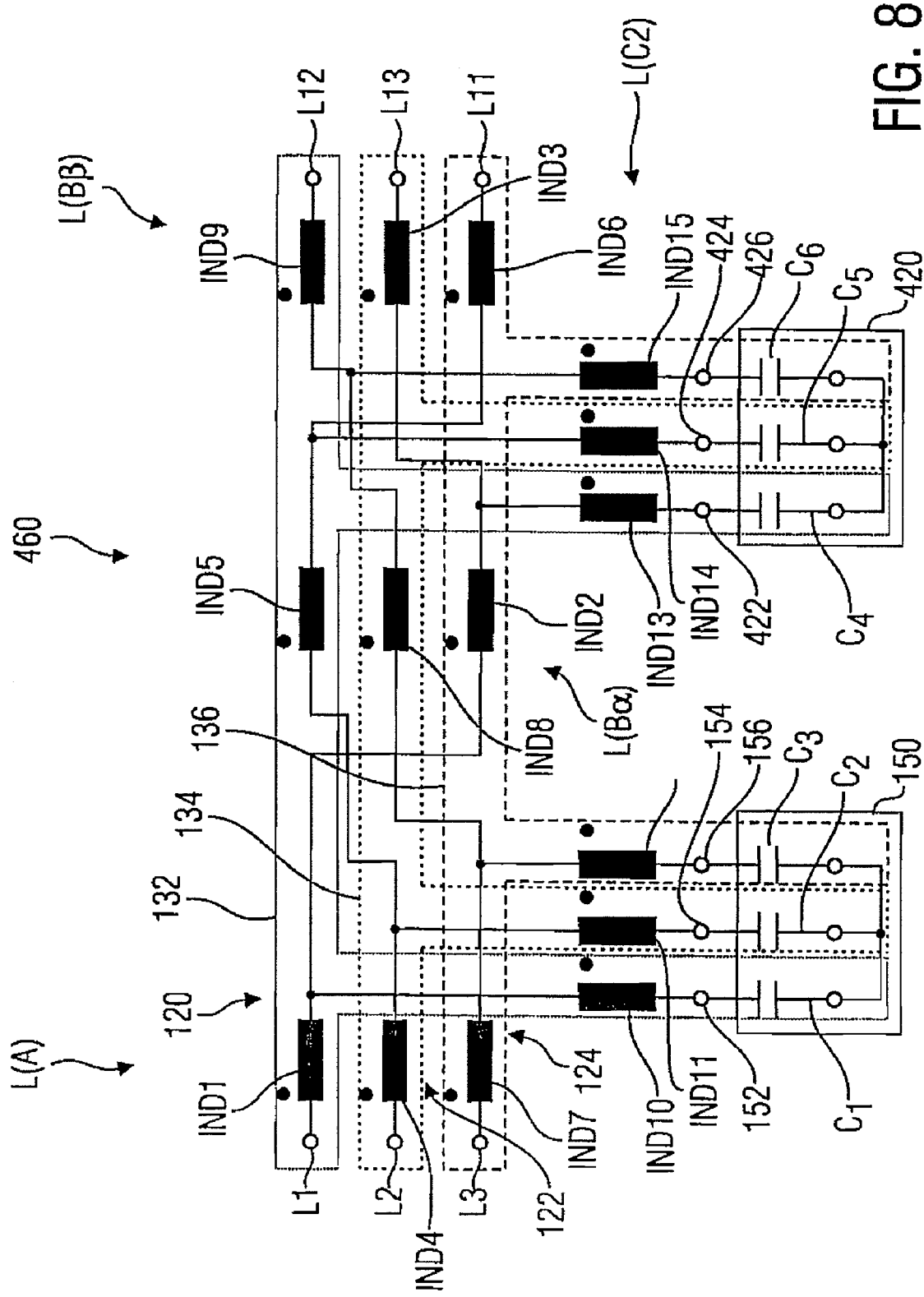
FIG. 8 shows a circuit diagram of an inventive three-phase line filter according to an eighth embodiment of the present invention.

FIG. 8 shows a circuit diagram of an inventive three-phase line filter according to an eighth embodiment of the present invention. Basically, this filter corresponds to the line filter 410 shown in FIG. 7, wherein the inductances in the longitudinal branch are connected like in the filter 260 shown in FIG. 4 instead of like in the filter 210 shown in FIG. 3. Thus, the filter 460 is only another alternative which may be used depending on the requirements and the mechanical circumstances.

Figure 9:
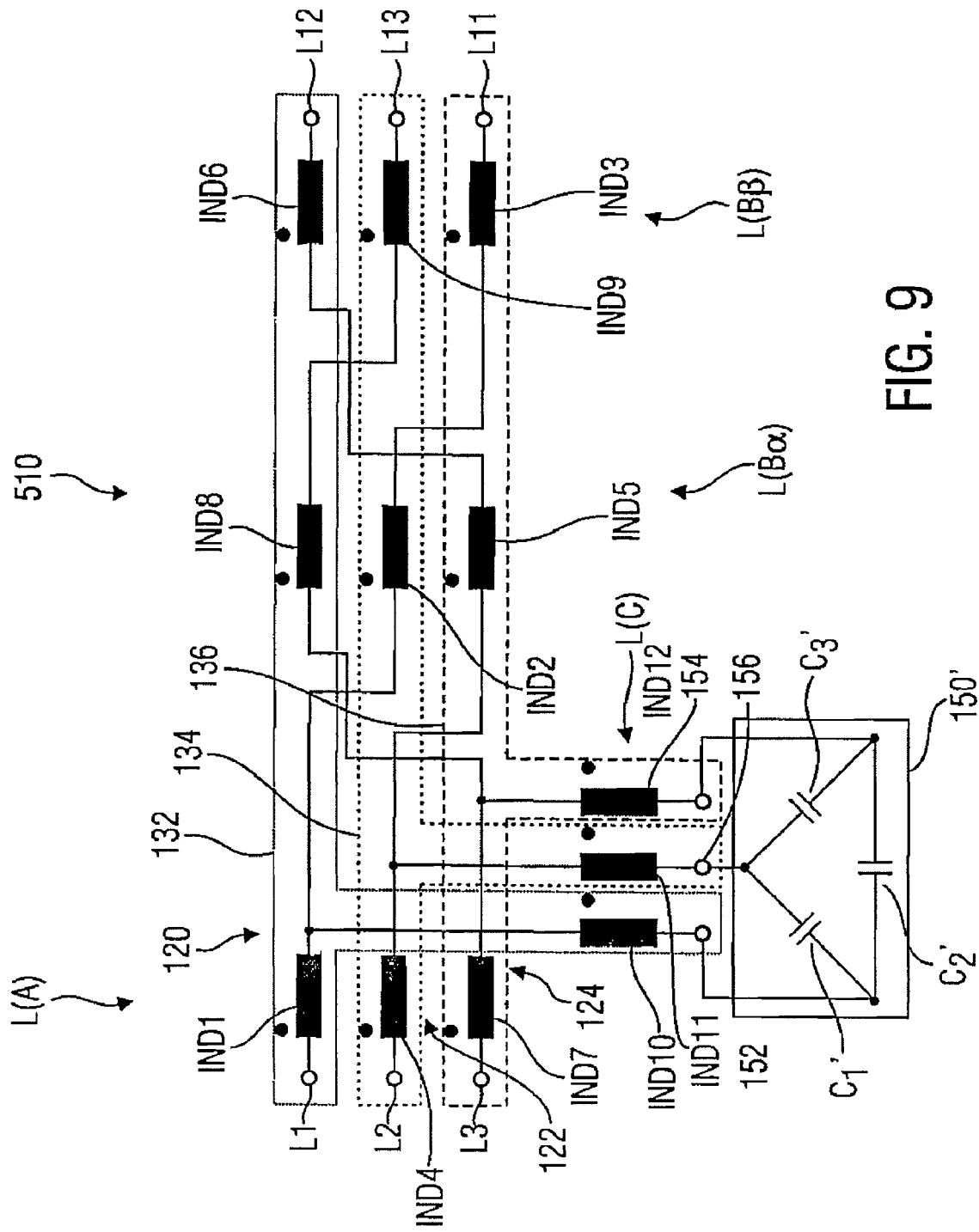
FIG. 9 shows a circuit diagram of an inventive three-phase line filter according to a ninth embodiment of the present invention.

FIG. 9 shows a circuit diagram of an inventive three-phase line filter according to a ninth embodiment of the present invention which, in its entirety, is referred to by 510. The filter basically corresponds to the line filters 210 and 260 shown in FIGS. 3 and 4, respectively, so that means remaining unchanged are not described again. Rather, reference is made to the description above. In particular, same reference numerals indicate same elements. The filter 510 is changed compared to the filter 210 in that the energy storage means 150' includes a triangular connection of capacitors C1', C2' and C3'. A triangular connection of capacitors, compared to a star connection, as is shown in the line filter 210, offers the advantage that the capacitors need to have a smaller capacitance. However, it is necessary for the capacitors of a triangular connection to be of higher dielectric strength than the capacitors of a star connection. Finally, when using a triangular connection, it is not possible to ground a terminal of the capacitors.

Thus, it is again dependent on the application and the requirements whether a star connection of capacitors or a triangular connection of capacitors is of more advantage.

The line filters shown can be changed to a great extent without departing from the central idea of the invention. Exemplarily, it is possible to use only one longitudinal inductance (such as, for example, IND2, IND5 and IND8) in each filter branch on the output side and to dispense with the second inductance (such as, for example, IND3, IND6, IND9). With such a filter, complete symmetry is no longer ensured, however it still has advantages compared to a conventional filter in which all inductances of a filter branch are arranged on the same leg of the filter core.

In addition, it is possible to wind the shunt inductances IND10, IND11, IND12 and, maybe, IND13, IND14, IND15 of a filter branch onto a different leg 132, 134, 136 of the filter core than the input-side inductance IND1, IND2, IND3. Such an exchange offers another degree of freedom when designing and implementing a line filter.

It is also possible without any problems to supplement a line filter by other filter stages and thus to achieve a higher-order filter. This, however, is more complicated in manufacturing, but offers an improved filter characteristic with a suitable design. This may be necessary if requirements on the filter effect are high.

Furthermore, it is also possible to add additional capacitances or inductances to the filter. Exemplarily, several shunt branches may be coupled to a connecting point between two longitudinal inductances arranged between the filter input and the filter output. A shunt branch here may include not only a series connection of an inductance and a capacitive energy storage element but also a capacitance itself. This may be helpful to suppress high-frequency disturbances, provided the capacitance is designed such that a capacitive reactive current at the rated frequency of the line filter is sufficiently small.

Furthermore, the filter can include switching means allowing the filter to be adjusted to different operating states. Thus, it can be of advantage to switch off shunt capacitances. It may also be desirable to bridge individual inductances. Thus, the voltage drop across the filter and/or a reactive current portion produced by the filter can be influenced. This may be of advantage when very strong load changes may occur or when the filter is to be configurable for a number of operating cases.

Finally, there is great flexibility when designing the polyphase filter core. In principle, all the core types available may be used, exemplarily cores made of iron or iron powder.

FIG. 10 shows an oscillogram of current forms at the network input and the output of an inventive line filter according to the filter shown in FIGS. 2 and/or 3. The oscillogram, in its entirety, is referred to by 610. It indicates a first curve shape 620 representing the current form at the input of the inventive line filter. Time is plotted on the abscissa t, whereas the input current is plotted on the ordinate I. Similarly, the oscillogram shows a second curve shape 630 representing the output current at the output of the inventive line filter. Again, time is plotted on the abscissa t, whereas the current is plotted on the ordinate I.

For the measurement, an inventive line filter is wired to a three-phase load comprising an internal B6 rectification and capacitor smoothing. The input current of the line filter which is described by the signal shape 620 is basically sinusoidal. The output current described by the curve shape 630, however, is nearly block-shaped. The current shape at the filter output indicates a very steep increase and a very steep drop in the current, whereas the current for great current values is nearly constant. In the region of the zero crossing, the current only changes slightly over time, so that the current flow for a time interval of around 2 ms (at a period duration of 20 ms) is nearly constant.

It is also to be mentioned here that the current shape shown has a period duration of around 20 ms, corresponding to a frequency of 50 Hz. The amplitude of the current is around 250 amperes.

It shows that the current flowing in the connected consumer may result, due to its block-shaped form, in a very small ripple current in the internal capacitors of the consumer. This may result in an increased lifetime of the electrolytic capacitors in the consumer and thus in an increased lifetime of the consumer appliance connected thereto.

In summary, it can be noted that the present invention describes a passive harmonic filter consisting of a combination of an intelligently connected multiple winding choke and several electrical capacitors and serving a significant reduction in current harmonics at the input of non-linear consumers.

The effects on the networks produced by non-linear consumers frequently result in disturbances in the public supply network or mains. The passive harmonic filter described above serves to significantly reduce the current harmonics of non-linear consumers, in particular of electronical appliances having internal B2 or B6 rectifier circuits and subsequent smoothing by capacitors or by a combination of capacitors and chokes. Electronical appliances of this kind are advantageously used in electrical driving systems. The special characteristic of the invention is the combination of a multiple winding choke and a unique wiring of the windings among one another and a connection of capacitors. The nearly sinusoidal current consumption achieved by this at the input of the line filter when coupling to non-linear consumers at the filter output is achieved by the inventive special technology entailing a minimum of setup volume and power dissipation. The inventive skillful wiring of different windings onto a magnetic core utilizes the magnetic characteristics of choke by eliminating different flow components in connection with the energy provided from capacitors. The resulting sinusoidal current consumption at the filter input is basically load-independent.

The harmonic filter is connected between the supplying mains voltage and the respective electronic appliance and is thus also referred to as front-end harmonic filter. An input-side parallel connection of several consumers is possible under certain conditions and is referred to as group compensation and/or group filter.

The harmonic filter consists of a multiple winding choke in which all windings are wound in the same direction of winding and distributed over the phases to the different legs of a magnetic three-phased iron core. Thus, at least one winding of one phase (exemplarily phase L1) is always wound onto a different leg than the remaining windings. The capacitors connected can be coupled at least to one or several connective points of the windings.

The resulting filter circuit reduces current harmonics at the input of the filter considerably and at the same time provides for a smoothed direct current downstream of the rectifier. A strongly reduced ripple current in the downstream smoothing capacitors is achieved by this.

Disadvantages of well-known harmonic filters are reduced to a minimum in an inventive line filter. The technical characteristics are thus improved considerably compared to present solutions. Due to its small setup volume, its small power dissipation and low expense, an inventive harmonic filter is an attractive and marketable filter for reducing current harmonics.

The distribution of the individual windings onto at least two legs or more of a three-phase magnetic iron core results in a reduction in the effective voltage drop in the longitudinal branch of the filter. In addition, an elimination of individual flow components is achieved by the skillful distribution of the windings onto at least one or more legs of the three-phase iron core. This does not only reduce the voltage drop at the longitudinal branch of the filter, but also the capacitors connected in the shunt branch can be reduced considerably since the energy to be provided from the capacitors decreases. This in turn results in a smaller capacitive reactive current in no-load operation or under partial load conditions. Switching off the capacitances is no longer required in most applications. By a computer-aided calculation and knowledge obtained by means of measuring technology, the values of the individual inductances of the multiple winding choke can be optimized precisely and tuned to one another. The result is a smaller winding complexity and thus smaller losses. In addition, the relation of the individual inductances to the capacitors connected can be established precisely by the calculations mentioned to find an optimum and keep the oscillation tendency of the filter system very low.

A filter according to FIGS. 2 or 3 and/or according to FIGS. 4 to 9 comprises at least one winding per phase on a different leg of the three-phase magnetic core than the remaining windings and has at least one capacitor connected per phase. The capacitors may be wired in a star or in a triangle. In a particularly advantageous filter, all windings have the same winding direction. Thus, the winding direction can be positive or negative in all windings. This does not change the actual function of the inventive principle. The windings have the same direction of winding on every leg, i.e. also within the three phases L1, L2, L3. A multiple winding choke according to FIG. 3 has at least four or more windings per phase, wherein at least one winding (or more) per phase is wound onto a different leg of the three-phase iron core than the remaining windings. Put differently, at least one winding per phase is on a leg of the three-phase iron core which, according to definition, belongs to a different phase. Iron powder or any other material may be used for the iron core instead of iron.

The capacitors can be connected on the free side of the inductance in the shunt branch, at any connective point between the inductances in the longitudinal branch and the shunt branch. Capacitors can be connected either only once per phase or several times per phase when there are several connective points. It is to be pointed out in this respect that two connective points as a minimum will always be there. Furthermore, the capacitors may also be connected to all inductances of the shunt branches available. The capacitors may be connected to the inductances in the shunt branch either in a star or a triangle.

The wiring of the windings in the same direction of winding will only result in a technological advantage if an elimination of flow components takes place within the magnetic core. These are flow components which predominantly contain higher-frequency portions (having a frequency higher than the frequency of the supplying mains voltage of the filter). The mechanical three-phase setup of the magnetic core is utilized here in connection with the phase shift of the three phases L1, L2 and L3.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A three-phase harmonic line filter, comprising:
a first filter branch between a first filter input and a first filter output, the first filter branch comprising a first series connection of three inductances including an input inductance or an output inductance, connected between the first filter input and the first filter output and wound onto three different legs of a three-leg filter core;
a second filter branch between a second filter input and a second filter output, the second filter branch comprising a second series connection of three inductances including an input inductance or an output inductance, connected between the second filter input and the second filter output and wound onto three different legs of the three-leg filter core; and
a third filter branch between a third filter input and a third filter output, the third filter branch comprising a third series connection of three inductances including an input inductance or an output inductance, connected between the third filter input and the third filter output and wound onto three different legs of the three-leg filter core, wherein the input inductances or the output inductances of the three filter branches are wound onto different legs of the three-leg filter core;

wherein the first filter branch includes a first shunt inductance;

wherein the second filter branch includes a second shunt inductance;

wherein the third filter branch includes a third shunt inductance;

wherein a node where two inductances out of the at least three inductances of the first series connection are connected is coupled to a first terminal of a capacitive energy storage via the first shunt inductance;

wherein a node where two inductances out of the at least three inductances of the second series connection are connected is coupled to a second terminal of the capacitive energy storage via the second shunt inductance;

wherein a node where two inductances out of the at least three inductances of the third series connection are connected is coupled to a third terminal of the capacitive energy storage via the third shunt inductance; and wherein the three shunt inductances are arranged on the three legs of the three-leg filter core.

2. The three-phase harmonic line filter according to claim 1, wherein the three-phase line filter is implemented to pass on useful alternating currents of a predetermined frequency from the first filter input to the first filter output and from the second filter input to the second filter output to attenuate at the first filter output disturbing currents of a frequency other than the predetermined frequency occurring at the first filter input or to attenuate at the second filter input disturbing currents occurring at the second filter output.

3. The three-phase harmonic line filter according to claim 1, wherein the first series connection of three inductances includes a first inductance connected between the first filter input and the node, where two inductances of the first series connection are connected, and a second inductance connected between the node, where two inductances of the first series connection are connected, and the first filter output, and wherein the first filter branch further comprises third inductance coupled to the node, where two inductances of the first series connection are connected, to form a first shunt branch of the polyphase line filter; and wherein the second series connection of three inductances includes a fourth inductance connected between the second filter input and, and a fifth inductance connected between the node where two inductances of the second series connection are connected, and the second filter output, and wherein the second filter branch further comprises a sixth inductance coupled to the node, where two inductances of the second series connection are connected, to form a second shunt branch of the polyphase line filter;

wherein the second inductance and the fourth inductance are wound onto the same leg of the three-leg filter core.

4. The three-phase harmonic line filter according to claim 3, wherein the third inductance is coupled to first terminal of capacitive energy storage, and wherein the sixth inductance is coupled to second terminal of the capacitive energy storage.

5. The three-phase harmonic line filter according to claim 1, wherein the inductances of the first, second and third series connections comprise an equal direction of winding.

6. The three-phase harmonic line filter according to claim 1, wherein the series connections, with regard to numbers of windings of the inductances and with regard to a distribution of the inductances onto the legs of the three-leg filter core, are implemented such that a magnetic flux in one of said leg of the three-leg filter core is reduced referenced to a filter arrangement where the inductances of filter branch are wound onto a single one of said leg of the three-leg filter core.

7. The three-phase harmonic line filter according to claim 1, wherein the capacitive energy storage is a star connection of capacitors.

8. The three-phase harmonic line filter according to claim 1, wherein the capacitive energy storage is a triangular connection of capacitors.

9. The three-phase harmonic line filter according to claim 1, implemented such that a current flowing at a predetermined useful frequency through the first, second or third terminal of the capacitive energy storage comprises a smaller magnitude than a fourth of a current flowing at a maximum allowed load the filter through the first, second or third filter input.

10. A method of operating a three-phase line filter comprising a first filter branch between a first filter input and a first filter output, the first filter branch comprising a first series connection of three inductances including an input inductance or an output inductance, connected between the first filter input and the first filter output and wound onto three different legs of a three-leg filter core, a second filter branch between a second filter input and a second filter output, the second filter branch comprising a second series connection of three inductances including an input inductance or an output inductance, connected between the second filter input and the second filter output and wound onto three different legs of the three-leg filter core, and a third filter branch between a third filter input and a third filter output, the third filter branch comprising a third series connection of three inductances including an input inductance or an output inductance, connected between the third filter input and the third filter output and wound onto three different legs of the three-leg filter core, wherein the input inductances or the output inductances of the three filter branches are wound onto different legs of the three-leg filter core;

wherein the first filter branch includes a first shunt inductance;

wherein the second filter branch includes a second shunt inductance;

wherein the third filter branch includes a third shunt inductance;

wherein a node where two inductances out of the at least three inductances of the first series connection are connected is coupled to a first terminal of a capacitive energy storage via the first shunt inductance;

wherein a node where two inductances out of the at least three inductances of the second series connection are connected is coupled to a second terminal of the capacitive energy storage via the second shunt inductance;

wherein a node where two inductances out of the at least three inductances of the third series connection are connected is coupled to a third terminal of the capacitive energy storage via the third shunt inductance; and wherein the three shunt inductances are arranged on the three legs of the three-leg filter core, the method including passing on useful alternating currents from the first filter input to the first filter output and from the second filter input to the, second filter output.

* * * * *